United States Patent [19]
Vilardebo et al.

[11] Patent Number: 5,046,005
[45] Date of Patent: Sep. 3, 1991

[54] TEST SCORING MACHINE

[75] Inventors: Angelina N. Vilardebo; Charles K. Vilardebo, both of Satellite Beach, Fla.

[73] Assignee: Versatile Suppliers, Inc., Satellite Beach, Fla.

[21] Appl. No.: 352,345

[22] Filed: May 15, 1989

[51] Int. Cl.$^5$ .......................... G06F 15/38; G09B 7/00
[52] U.S. Cl. .................................. 364/419; 434/355; 434/358
[58] Field of Search ................ 364/419; 434/363, 358, 434/355; 400/660.3, 624

[56] References Cited
U.S. PATENT DOCUMENTS

| | | | |
|---|---|---|---|
| 3,413,735 | 12/1968 | Erbert | 35/48 |
| 3,574,263 | 4/1971 | Elia | 434/355 |
| 3,643,348 | 2/1972 | Azure, Jr. | 434/363 |
| 3,721,807 | 3/1973 | Miller et al. | 434/355 |
| 3,737,628 | 6/1973 | Azure, Jr. | 235/437 |
| 3,793,472 | 2/1974 | Sternberg et al. | 434/363 |
| 3,800,439 | 4/1974 | Sokolski et al. | 434/355 |
| 3,879,863 | 4/1975 | Georges | 434/355 |
| 3,900,961 | 8/1975 | Sokolski et al. | 434/363 |
| 3,983,364 | 9/1976 | Firehammer et al. | 434/358 |
| 4,547,161 | 10/1985 | Manning | 434/358 |
| 4,763,138 | 8/1988 | Piatt | 400/660.3 |
| 4,783,669 | 11/1988 | Piatt et al. | 400/624 |

Primary Examiner—Allen R. MacDonald
Assistant Examiner—Xuong M. Chung
Attorney, Agent, or Firm—William M. Hobby, III

[57] ABSTRACT

A test scoring machine apparatus is used for grading and scoring test papers and printing the scores directly on each test paper. The printer includes a printer driver and a print head for printing on single sheets of paper passing through the computer printer. A cut sheet feeder is attached to the computer printer for feeding single sheets of paper from a stack of paper to the printer. A light source is attached to the printer in a position for directing light onto the surface of one test sheet being fed from the sheet feeder into the computer printer. An optical reader is attached to the computer printer adjacent to the light source for reading the reflected light being reflected off the test sheet so that marks on each test sheet being fed into the printer are read by the optical reader. A computer is attached to the printer and operatively coupled to the optical reader for receiving the output from the optical reader and producing an output signal analogous to a score from the signals read by the optical reader. A printer interface may be a parallel or serial interface and is coupled to the computer with a cable for driving the print driver to in turn drive the printer print head for printing a score on a test paper as it passes through the printer.

7 Claims, 2 Drawing Sheets

TEST SCORING MACHINE

BACKGROUND OF THE INVENTION

The present invention relates to a test scoring machine and especially to a test scoring machine interconnected with a printer, and cut sheet feeder for printing a test score directly on each test sheet as it passes through the computer printer.

In the past, a variety of test scoring or paper grading machines have been provided which use scoring sheet in which a student marks the answer on the scoring sheet while reading the test questions from a separate test booklet. The scoring sheet is typically marked with special pencils and may be graded in a variety of ways. The answer sheet can be read optically or magnetically to sense the individual markings for each column. In a typical case, the test sheet with the correct answers has been preprogrammed into the grading machine which can then read the presence or absence of a mark in the correct answer position and the final score totalized so that a printout of the scores of all the students can be obtained. Answer sheets typically have a column or other markings to assure that the correct row and columns are recognized upon the entry of each sheet.

Prior art grading or test scoring machines can be seen in a number of U.S. patents, including the Sokolski et al., U. S. Pat. No. 3,900,961, for test scoring apparatus which includes a control mark column containing a start of the test mark and a plurality of answer control marks and an end-of-page mark. Individual light sources illuminate each column for a photo sensor. Detection of each incorrect answer causes an arrow mark to be printed on the test sheet and detection of the end-of-page mark causes a score printout. In the Georges U.S. Pat. No. 3,879,863, an examination paper scoring assembly is provided. A multichoice type test score answer sheet can be placed in the machine and an optical readout made of the score. In the Erbert patent, an optical pattern recognition system is provided. In the Azure Jr. U.S. Pat. No. 3,737,628, an automatically programmed test grading and scoring method and system is provided by using a correct answer information program card which then compares each student card with the correct answer information for grading the student's card. The Flaherty et al. U.S. Pat. No. 3,216,132, is a test scoring machine which has lamps on one side shining through a paper which has been marked, such as by punching holes in the paper for reading by an optical reader for grading papers. The Britton U.S. Pat. No. 4,228,952 is an automatic mark reading machine for grading test answer sheets. The Azure Jr. et al U.S. Pat. No. 3,487,561, is a test grading marking method and apparatus which marks each incorrect answer adjacent the answer on the test card. The Elia U.S. Pat. No. 3,574,263, is an examination grading computer which shines a series of light sources aligned with columns and the test papers being fed through the machine for reading by optical readers.

In addition to these prior patents, one recent grading system provides the software for a conventional microcomputer which is connected to a conventional computer printer and to an off-the-shelf optical scanner. An interface to the computer and software is provided so that the test can be fed to an optical scanner, read by the computer, test scores calculated and a printout made on the printer.

In contrast to these prior art devices, the present invention uses a standard computer printer, such as a standard dot matrix printer having a commercial cut sheet feeder attached thereto. An optical reader is attached to the printer adjacent the cut sheet feeder to optically read each test answer sheet as it is fed by the cut sheet feeder into the printer. A computer interface attached to the printer then reads the optical signals, calculates the test score and prints it on each paper as the paper passes through the printer. Initially, a master document having the correct answers thereon is fed through the printer and its graphic contents converted to digital form by the grading machine so that pattern recognition of each successive test going through can be compared to the pattern on the master document having the correct answer set, then the total number of answers can be calculated for use in printing a numeric grade.

SUMMARY OF THE INVENTION

A personal grading machine or test scoring machine is provided which is built around a standard computer printer for printing on a single sheets of test paper. The printer has an input for single sheets of paper and output therefrom. The computer printer has a printer driver and a print head for printing onto the single test sheets of paper passing through the computer printer. A cut sheet feeder is attached to the computer printer for feeding single sheets of paper from a stack of test answer sheets fed to the printer. A light source, such as a fluorescent light, is attached to the printer in position for directing a light onto the surface of each answer sheet of paper being fed from the sheet feeder into the computer printer. An optical reader is attached to the computer printer adjacent the light source for reading the reflected light from the surface of the test sheet so that marks on each test sheet of paper being fed into the printer are read by the optical reader. Computer electronics are attached to the computer printer and operatively coupled to the optical reader for producing an output signal responsive to signals from the optical reader which can individually mark answer rows on an answer sheet and produce an output signal analogous to the score of the signals read by the optical reader. The computer electronics is connected to the printer interface through a computer cable to couple the printer electronics to the computer printer print driver for driving the printer print head for printing an indication of each wrong answer and of the score on the test paper being fed from the sheet feeder through the printer.

BRIEF DESCRIPTION OF THE DRAWINGS

Other objects, features, and advantages of the present invention will be apparent from the written description and, the drawings in which.

DETAILED DESCRIPTION OF THE PREFERRED EMBODIMENT

Figure 1:
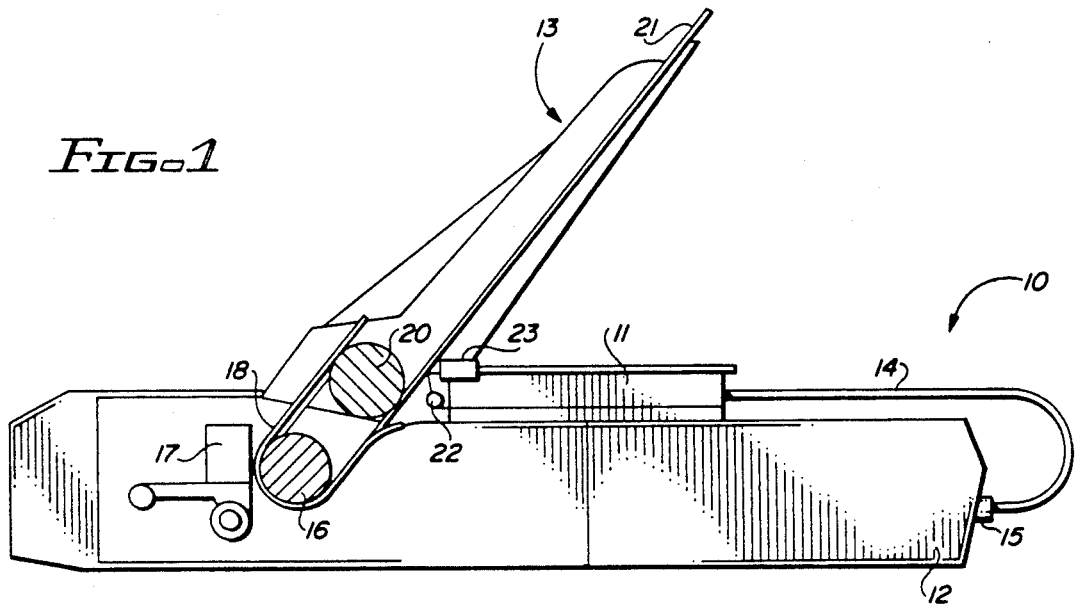
FIG. 1 is a sectional view taken through a grading machine in accordance with the present invention.

Referring to the drawings, a test grading machine 10 in accordance with the present invention has an electronic assembly 11 interfaced to a printer 12. The printer 12 has a cut sheet feeder attachment 13 attached thereto. The printer and the cut sheet feeder are off-theshelf commercial items, such as a dot matrix printer having a matching cut sheet feeder. The computer electronics 11 is interfaced through a cable 14 directly to the printer 12 through the parallel or serial port 15 of the printer 12. The printer, as can be seen in FIG. 1, has a platen 16 along with a print head 17 which moves back and forth in front of the platen 16 to print directly on a sheet of paper 18 being fed through the printer 12. The cut sheet feeder 13 has a cut sheet feeder paper roller 20 for feeding individual sheets of paper from a stack of test papers 21 in the cut sheet feeder 13, one sheet at a time. A light source 22 is mounted to the printer 12, electronic box 11 for directing light against the bottom most test sheet 21 as it is fed from the stack of test papers into the printer 12. An optical reader or scanner 23 is mounted adjacent the light source 22 for receiving light reflected from the light source off the bottom test paper into the optical reader 23. The optical reader is then coupled to the computer electronics 11. In operation, a test document provided with the correct answers is placed in a sheet feeder 13 first and passed through the printer where it is read by the optical reader 23. As the master document passes through the printer 12, its graphic content is read by the reader 23 and converted by the electronics 11 to digital form. A pattern recognition algorithm is used to detect the patterns on the master document that constitute the correct answer set. Each position of every individual correct answer on the master document is then stored for future use. In addition, the total number of answers is calculated for use in numeric grade determination once the master document has been read by the optical reader 23 and computer electronics 11.

The grading machine 10 is ready to read and score test documents. Individual test documents are placed in the cut sheet feeder 13 and are individually read and processed in an identical manner to the master document. If an answer pattern is absent or present in a position that does not match the master document, an "X" is printed directly in the line where the error occurs. Correct answers are counted for scoring. This process continues until a test document is completely processed and before the document exits the printer, the numeric grade is printed at the bottom of the test document. It must be noted that the grade will be printed at the physical bottom of the test document. Design of the grading machine does not preclude and will have the option of placing the test documents in the printer upside down. This will allow for recording of the numeric grade at the top of the test document. Thus, the grading machine marks each incorrect answer and provides a numeric grade directly on the original test document. No preprinted positional identifying marks are necessary as normally required by the prior art in either the master or the test documents. The only criteria for answer pattern detection is that an area of approximately equal to the area covered by an individual text character (typically 0.1" wide ×0.125" vertical) be used for the multichoice answer selection. The test documents are typically 8½" wide ×11" in length while margins of one inch at the top of the page and one inch at the bottom of the test document are not normally used as an answer area. Answer marks can be placed anywhere on the test document. The marking may be in any color and in any density desired.

Figure 2:
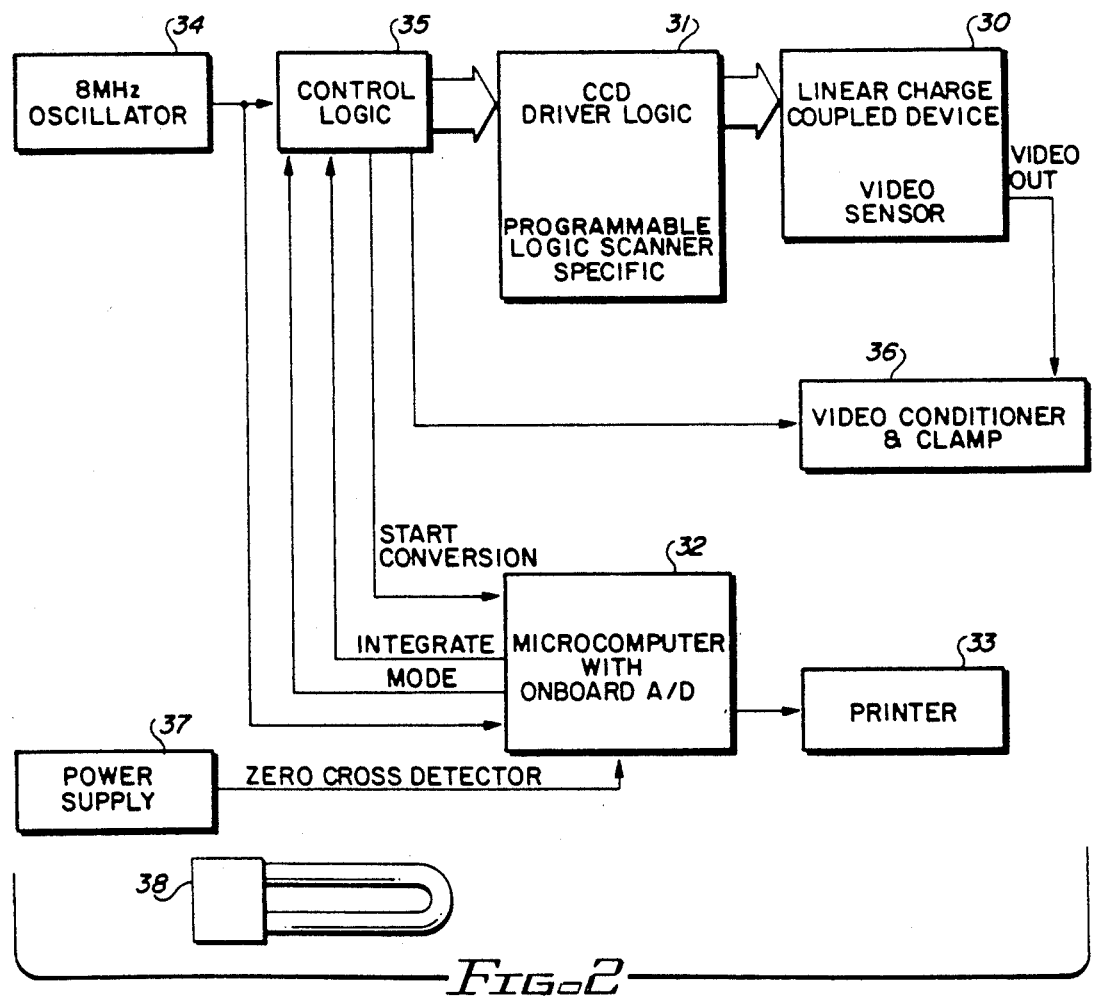
FIG. 2 is a block diagram of a test grading machine in accordance with the present invention.

Referring to FIG. 2, a top level hardware block diagram of the grading machine electronics in accordance with the present invention is illustrated. Scanning of the document is performed by a linear photo sensitive charged coupled device (CCD) array 30. The array 30 is coupled to the document with a self-focused (selfoc) lens that is wide enough to overlap the document area being scanned. The array may consist of four individual CCD linear arrays mounted on a ceramic substrate. A driver logic circuit 31 generates the necessary scan signals for the CCD 30. Each element or pixel of the CCD is sequentially readout. The CCD 30 output consists of analog voltages that are proportional to the amount of light each pixel receives. The analog voltage is converted to a digital value using an analog-to-digital converter in the microcomputer circuit 32. This data is processed by the microcomputer controlled circuit 32 of the grading machine firmware. The printer mechanism 33 is under microcomputer control of the microcomputer 32 and is used to provide vertical motion to the document to complement the horizontal scan provided by the charge coupled device 30. Electronics may include an eight mHz oscillator 34 coupled to the control logic 35 which in turn is coupled to the microcomputer 32. The programmable logic scanner 31 is connected to the optical reader circuit 30. The optical reader circuit 30 provides a video output directly through a video conditioner and clamp 36 which then routes the conditioned signal to the microcomputer 32. A power supply 37 provides the correct voltage for the microcomputer 32 and for the electronics and also is connected to the fluorescent lamp 38. In operation, the oscillator 34 sets the operating rate while the control logic 35 responds to the microcomputer 32 commands to set the operational mode to control the integration period to set a parallel or serial readout mode and to signal the start of analog to digital conversion. Control logic 35 is coupled to the charge coupled device driver logic 31 which generates specific signals necessary for the charge coupled device array 30 operation. Charge coupled device 30 is coupled to the video conditioner and clamp 36 which sets the bandwidth, the gain and the DC level of the video signal from the video sensor 30. The video conditioner and clamp 36 is coupled to the microcomputer 32 which interprets the video signals from the video conditioner and clamp 36 as well as provide the analog-to-digital conversion of the signals from the video sensor 30 and provides image evaluation. A power supply 37 converts the AC to an operating voltage while the fluorescent lamp 38 provides the light source for reading the test documents.

Figure 3:
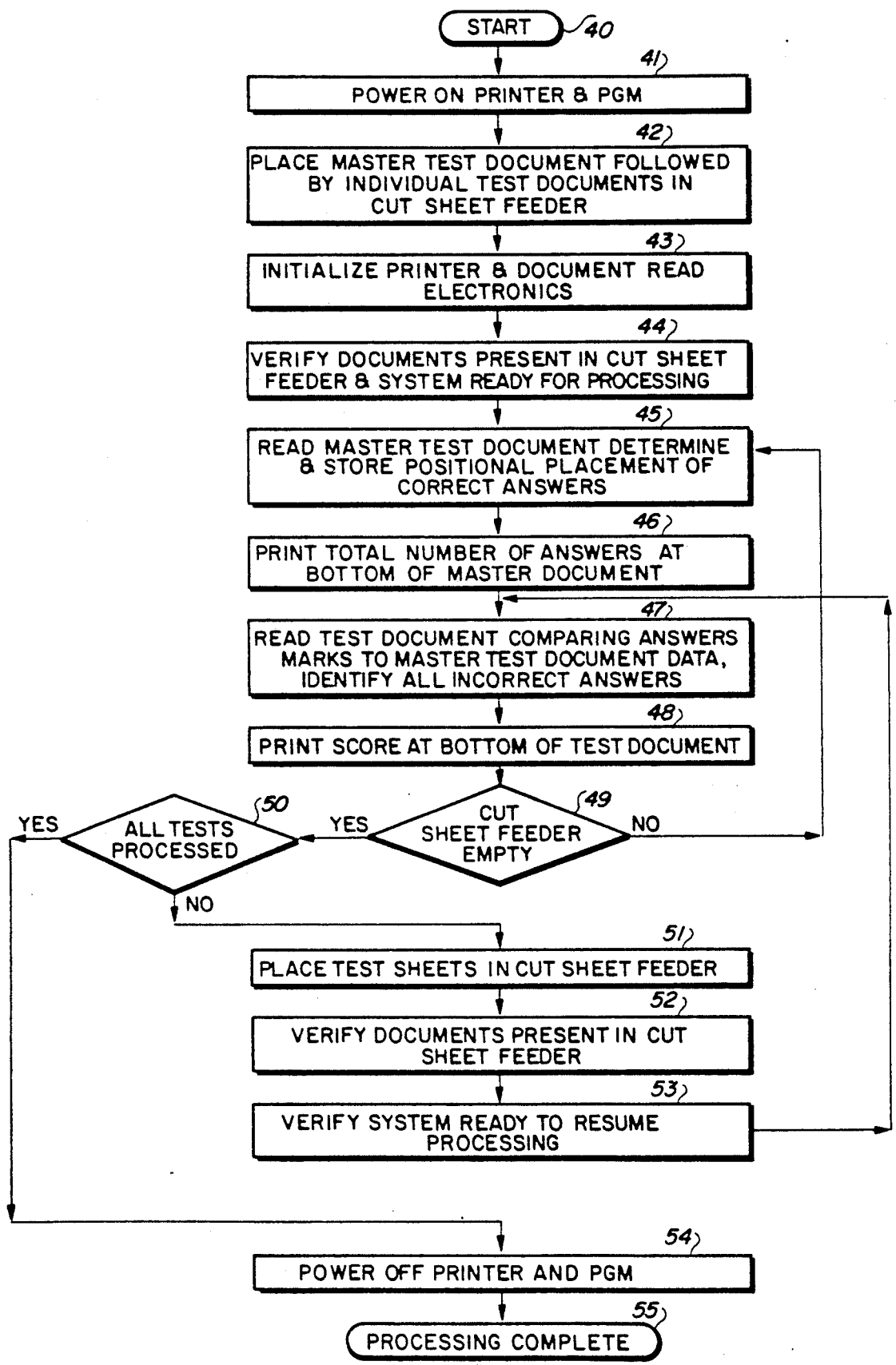
FIG. 3 is a grading machine logic flow diagram.

Referring to FIG. 3 of the drawings, a logic flow diagram of the operations performed by the grading machine 10 is presented and illustrates a processing of the document 8½" wide ×11" long with test character spacing of 10 characters per inch horizontally and 8 characters per inch vertically. These sizes are chosen as typical and represent dimensions found in an answer sheet. They are programmable to other values within the limits of test document readability and printer mechanisms being utilized. All quantitative numeric data presented is derived from a typical document and character size dimensions. These numeric data are also programmable and are proportional to the actual dimensions used.

In operation, a series of horizontal scans are performed for digitization of the test answer area. An individual horizontal scan produces 110 pixels per inch and transverses eight horizontal inches providing 880 pixels of data. Scanning of the document for answers takes place for the width of the test document between one inch margins located at the top and bottom of the document. The top margin area is used for determination of an average pixel value reading of the test document background. Subsequent pixel values are then computationally normalized to the average pixel reading established during reading the top margins. This adjusts the data to the document background threshold. The total set of pixel data covering the test answer area consists of 880×720 or 633,600 samples. Rather than store all this data, the adjacent pixels are combined into composite answer marks. There are ten answer marks per inch horizontally and eight answer marks per inch vertically. The entire viable mark area on an 8½"×11" document is then represented by ten answer marks per inch ×8"×8 answer marks per inch ×9" or 5760 possible answer mark positions per test document. Each answer mark comprises 99 pixels (11 horizontal and 9 vertical). The digital representation of each pixel ranges from 0-64. These values are computationally adjusted by the average document background reading derived from scanning the margin area. Once adjusted, each pixel value is compared to a nominal background threshold value and the adjusted pixel value greater than threshold is reassigned a value of one while a pixel value below the threshold is reassigned a value of zero. These reassigned pixel values are then accumulated in their respective answer mark positions. A completely filled answer mark position will then have a numeric value of 99.

Statistical analysis of alpha numeric text subjected to this digitization and processing technique, yields a maximum answer mark value of 64. Marking at least 80% of the 1/10"×⅛" of the answer mark area yields a viable convention for answer mark determination. All answer mark values between 80 and 99 will be processed as answer selections and are uniquely distinguishable from textual information contained on the test document.

Using this test answer and representation process, the logic performed by the present grading machine consists of first reading a master test document containing all the correct answers. These answers are stored in electronic memory local to the grading machine. Positional placement of these answers in local memory allows direct correspondence to the location of the test answer on the document read. In the process of reading the master document, a total of all answer marks is computed and retained for later use in numerical grade computation. After the master test document has been read, individual test documents are read and processed. Reading and processing of the test document is performed on the answer mark line basis. Each answer mark line read results in 80 answer mark values. This data is compared to the respective line position of the master test document stored data. Correct answers contained on the test document are totaled. When an incorrect answer is detected on an individual answer line, presence of the incorrect answer is printed directly on the line in error as it passes through the print mechanism. This process continues until the entire test area has been processed. At this point, the numeric grade is calculated by dividing the number of correct answers detected by the number of correct answers present in the master test document. This numeric grade is printed at the bottom of the test document after the test area has passed through the print mechanism.

FIG. 3 presents a summary of the grading machine logic flow. The process begins at (40), when the operator applies (41) electrical power to the printer and grading machine electronics. The operator then places (42) the master test document followed by the test documents in the cut sheet feeder. The grading machine microprocessor proceeds to initialize (43) the printer interface electronics and the document read electronics verifies (44) that documents are present in the cut sheet feeder and the system is ready for processing.

At this point the master test document is read (45) and the correct answers contained on the master test document are stored (45) in the grading machine memory for later reference. In addition, the total number of answers detected are counted and printed (46) at the bottom of the master document for later manual verification. This count is also retained in grading machine memory for later numeric grade calculation.

Test documents are processed in the loop depicted in (47) through (53). Each test document is read (47) on one answer line at a time. Each line is compared (47) to the master document data stored (45) in the grading machine electronics memory. When a nonmatching comparison is detected (47), an "X" is printed on the original test document adjacent to the incorrectly marked answer. This process continues until the entire test document has been read. The final test score is then calculated and printed (48) on the bottom of the test document.

The cut sheet feeder document status is next determined (49). If the status shows more documents are present in the cut sheet feeder, control reverts to (47) where the test document reading and scoring process is repeated.

Otherwise, operator intervention (50) provides the determination if all tests have been processed by placing (51) more test documents in the cut sheet feeder or powering off (54) the printer and grading machine electronics to thereby terminate (55) the process.

When more test documents are placed (51) in the cut sheet feeder, the grading machine verifies (52) that documents are present in the cut sheet feeder and verifies (53) that the system is ready to resume processing. At this juncture, control reverts to begin reading and processing (47) the next test document.

It should be clear at this time that a grading machine has been provided which is installed in a computer printer using a standard cut sheet feeder combination and modified by adding a light source and optical scanner to read each document being fed from the sheet feeder to the printer and the mounting of an electronic package for microcomputer circuitry which has an analog-to-digital converter along with firmware in memory for driving the printer to mark any answer line in an answer sheet as well as to put a final score on the answer sheet as it is being fed to the printer. Advantageously, an inexpensive commercially available computer printer is utilized with a commercial cut sheet feeder along with commercially available light source and optical scanner attached thereto to control electronics mounted in or on the computer printer for driving the printer. However, the present invention is not to be considered as limited to the forms shown which are to be considered illustrative rather than restrictive.

We claim:

1. A test scoring machine comprising:
a computer printer for printing on single sheets of paper, said computer printer having an input for single sheets of paper and an output for single sheets of paper to exit said printer and said computer printer having a printer driver and a print head for printing onto single sheets of paper passing through said computer printer;

a cut sheet feeder attached to said computer printer for feeding single sheets of paper from a stack of sheets of paper to said printer;

a light source attached to said printer adjacent said cut sheet feeder in a position for directing a light onto the surface of a sheet of paper being fed from said sheet feeder into said computer printer;

an optical reader attached to said computer printer adjacent said light source and cut sheet feeder for reading the reflected light from said light source off the surface of a sheet of paper being fed from said sheet feeder into said computer printer, whereby marks on each said sheet of paper being fed into said printer are read by said optical reader;

computer means attached to said computer printer and operatively coupled to said optical reader for receiving the output from said optical reader and producing an output signal analogous to a score of the signals read by said optical reader, said computer means including storage means for storing a scanned master document containing positional placement of test answers and comparing means for comparing each scanned test sheet with said storage means stored master document; and printer interface means coupling said computer means output to said computer printer print driver for driving said printer print head for printing a score on a test paper being fed from said sheet feeder through said printer whereby a test paper fed into a printer has the score printed thereon as it exits the computer printer.

2. A test scoring machine in accordance with claim 1 in which said computer means includes an analog-to-digital converter for converting signals from said optical reader to digital signals.

3. A test scoring machine in accordance with claim 2 in which said computer printer has a housing and said computer means is attached to said computer printer housing.

4. A test scoring machine in accordance with claim 3 in which said light source and said optical reader are attached to said computer printer means housing adjacent said cut sheet feeder.

5. A test scoring machine in accordance with claim 4 in including a cable connected between said computer means and the printer port of said computer printer.

6. A test scoring machine in accordance with claim 5 in which said cable connected between said computer means and the printer port of said computer printer is connected to a parallel printer port of said computer printer.

7. A test scoring machine in accordance with claim 5 in which said light source is a fluorescent lamp.

* * * * *